US006636725B1

(12) United States Patent
Yoshimoto

(10) Patent No.: US 6,636,725 B1
(45) Date of Patent: Oct. 21, 2003

(54) ANTENNA EQUIPMENT AND COMMUNICATION TERMINAL EQUIPMENT

(75) Inventor: Hiromasa Yoshimoto, Chiba (JP)

(73) Assignee: Sony Corporation, Tokyo (JP)

( * ) Notice: Subject to any disclaimer, the term of this patent is extended or adjusted under 35 U.S.C. 154(b) by 429 days.

(21) Appl. No.: 09/689,431

(22) Filed: Oct. 12, 2000

(30) Foreign Application Priority Data

Oct. 13, 1999 (JP) .......................................... 11-291382

(51) Int. Cl.[7] .................................................. H04B 1/38

(52) U.S. Cl. ..................................... 455/90; 379/433.01

(58) Field of Search .......................... 455/90, 550, 575, 455/300; 379/433.01; 343/702, 895

(56) References Cited

U.S. PATENT DOCUMENTS 5,969,682 A * 10/1999 Ito et al. ..................... 343/702
6,434,369 B1 * 8/2002 Kanayama ................... 455/90

FOREIGN PATENT DOCUMENTS

EP 0790665 8/1997 ............ H01Q/1/36
EP 0848448 6/1998 ............ H01Q/9/04
WO 9943041 8/1999 ............ H01Q/1/24

* cited by examiner

*Primary Examiner*—Lee Nguyen
*Assistant Examiner*—David Q. Nguyen
(74) *Attorney, Agent, or Firm*—Jay H. Maioli

(57) ABSTRACT

To facilitate the constitution and operativity of a helical antenna included in a communication terminal equipment such as a portable telephone. An antenna device includes a circuit board 10 on which a communication circuit is arranged, a shield case 20 arranged on this circuit board and shielding at least a part of an interior of the circuit with a conductor film formed on a part of an outer surface or an inner surface, a conductor pattern 23 formed into a predetermined pattern on a portion 22 of the surface or the inner surface of the shield case on which portion the conductor film is not formed, and a feeder section 12 for making the conductor pattern continuous with an antenna connection section of a communication circuit arranged on the circuit board.

3 Claims, 3 Drawing Sheets

ANTENNA EQUIPMENT AND COMMUNICATION TERMINAL EQUIPMENT

BACKGROUND OF THE INVENTION

1. Field of the Invention

The present invention relates to an antenna equipment suited to be applied to a radio communication terminal equipment, such as a portable telephone, and to a communication terminal equipment having this antenna equipment installed thereto.

2. Description of the Related Art

There has been known hitherto, as an antenna equipment provided at a radio communication terminal equipment such as a portable telephone, an antenna apparatus using a helical antenna. FIG. 4 is an exploded, perspective view of the constitution of a conventional portable telephone using a helical antenna. In this example, a surface-side case 1 and a back surface-side case 2 made of resin are joined to each other, thereby providing a terminal equipment configured as a portable telephone. A plurality of operation keys 3 (FIG. 4 shows the back surfaces of the keys) such as a dial key, and a display panel member 4 displaying a telephone number or the like, are arranged on the surface-side case 1. Also, a microphone 1*a* and a speaker 1*b* are attached onto the surface-side case 1. Further, the tip end portion of a rod-like whip antenna 5 is arranged at a position which becomes an upper side when the terminal equipment is used. The whip antenna 5 is constituted as, for example, an expandable antenna.

A shield case 7 is attached to a circuit board 6 arranged between the surface-side case 1 and the back surface-side case 2 so as to cover circuit components on the board. Further, a helical antenna 9 is attached at a position of the circuit board 6 facing the back surface-side case 2. This helical antenna 9 is arranged in a state, for example, in which a wire is wound planarly as shown in FIG. 4 and the wound portion is slightly distant from the surface of the board 6. One end of the wire is electrically continuous to a feeder section 9*a* (i.e., the antenna connection section) on the circuit board.

The portable telephone constituted as stated above is provided with, as antennas, two antennas, i.e., the whip antenna 5 and the helical antenna 9. Normally, the expandable whip antenna 5 protruding from a main body and is used as an antenna for both transmission and reception purposes, whereas the helical antenna 9 included in the main body is used as an antenna for reception only. During reception, the portable telephone is constituted such that the two antennas 5 and 9 are employed and diversity reception is carried out using an antenna capable of ensuring good signal reception.

SUMMARY OF THE INVENTION

By providing the terminal equipment with two antennas, it is possible to enhance reception performance. However, it takes labor to manufacture the helical antenna included in the main body and operation such as soldering is also required when attaching the helical antenna to the circuit board. Thus, if the helical antenna is included in the main body, the production cost of the terminal equipment disadvantageously increases. Namely, since the helical antenna itself requires winding a copper wire or the like helically using a tool or the like, it takes labor to manufacture the helical antenna. Further, if the helical antenna consisting of a wound wire or the like is attached to the circuit board, it is necessary to fix the antenna onto the board by soldering or the like while making the wound portion distant from the surface of the circuit board. Thus, it takes more labor than soldering chip components or the like.

In view of the above respects, it is an object of the present invention to facilitate the constitution of a helical antenna included in a terminal equipment of this type and facilitate attachment operativity.

An antenna equipment according to the present invention comprises a housing arranged on a circuit board; a conductor pattern formed into a predetermined pattern on a predetermined portion of an surface or an inner surface of the housing; and a feeder section making a predetermined circuit formed on the circuit board continuous to the conductor pattern.

According to the antenna equipment of the present invention, the conductive pattern formed on the surface or the, inner surface of the housing functions as an antenna element. In that case, only by arranging this housing on the circuit board, the antenna can be attached to the circuit board.

A communication terminal equipment according to the present invention comprises a circuit board on which a communication circuit is arranged; a shield case arranged on this circuit board and shielding at least a part of an interior of the circuit with a conductor film formed on a part of outer surface or the inner surface of the shield case; a conductor pattern formed into a predetermined pattern on a portion of the surface or the inner surface of the shield case on which portion the conductor film is not formed; and a feeder section making the conductor pattern continuous to an antenna connection section of the communication circuit arranged on the circuit board.

According to the communication terminal equipment of the present invention, the conductor pattern formed on the surface or the inner surface of the shield case functions as an antenna element. In this case, by simply arranging this shield case on the circuit board, the antenna can be attached to the circuit board.

DESCRIPTION OF THE PREFERRED EMBODIMENTS

Figure 2:
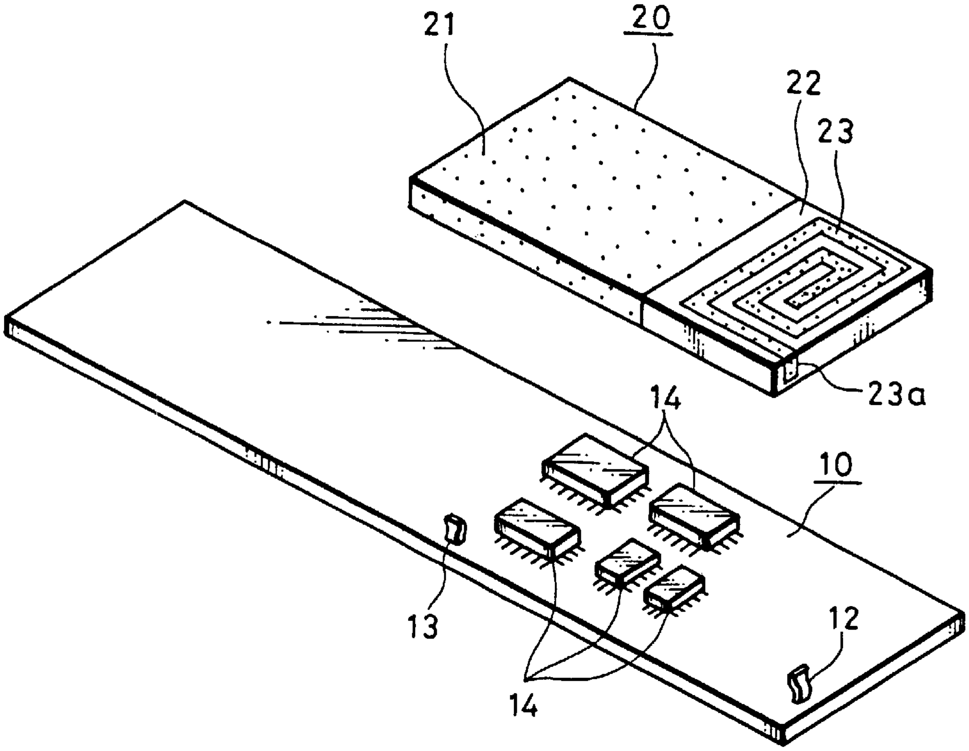
FIG. 2 is a further exploded, perspective view of a circuit board and a shield case shown in FIG. 1.
Figure 3:
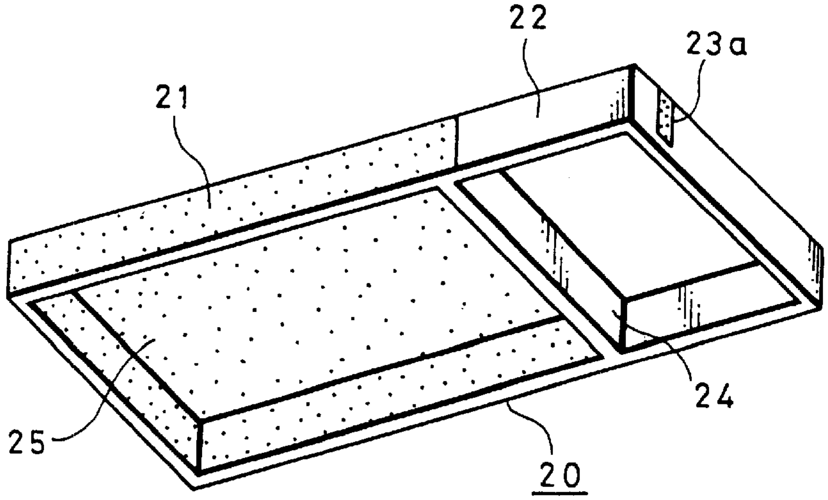
FIG. 3 is a perspective view seen from a different direction from the direction of FIG. 2.

One mode for carrying out the present invention will be described hereinafter with reference to FIGS. 1 to 3.

Figure 1:
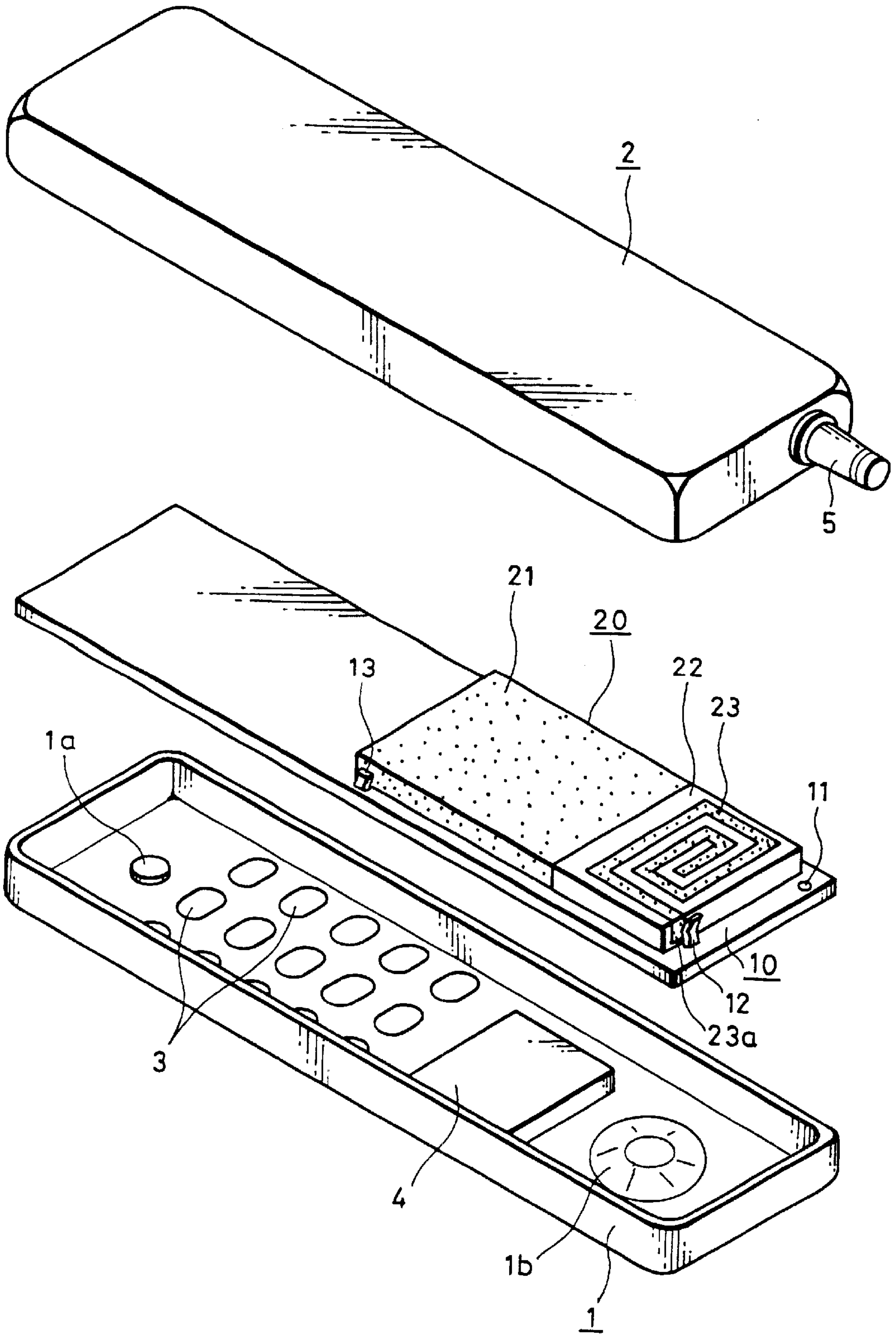
FIG. 1 is an exploded, perspective view of an example of constitution in one mode for carrying out the present invention.
Figure 4:
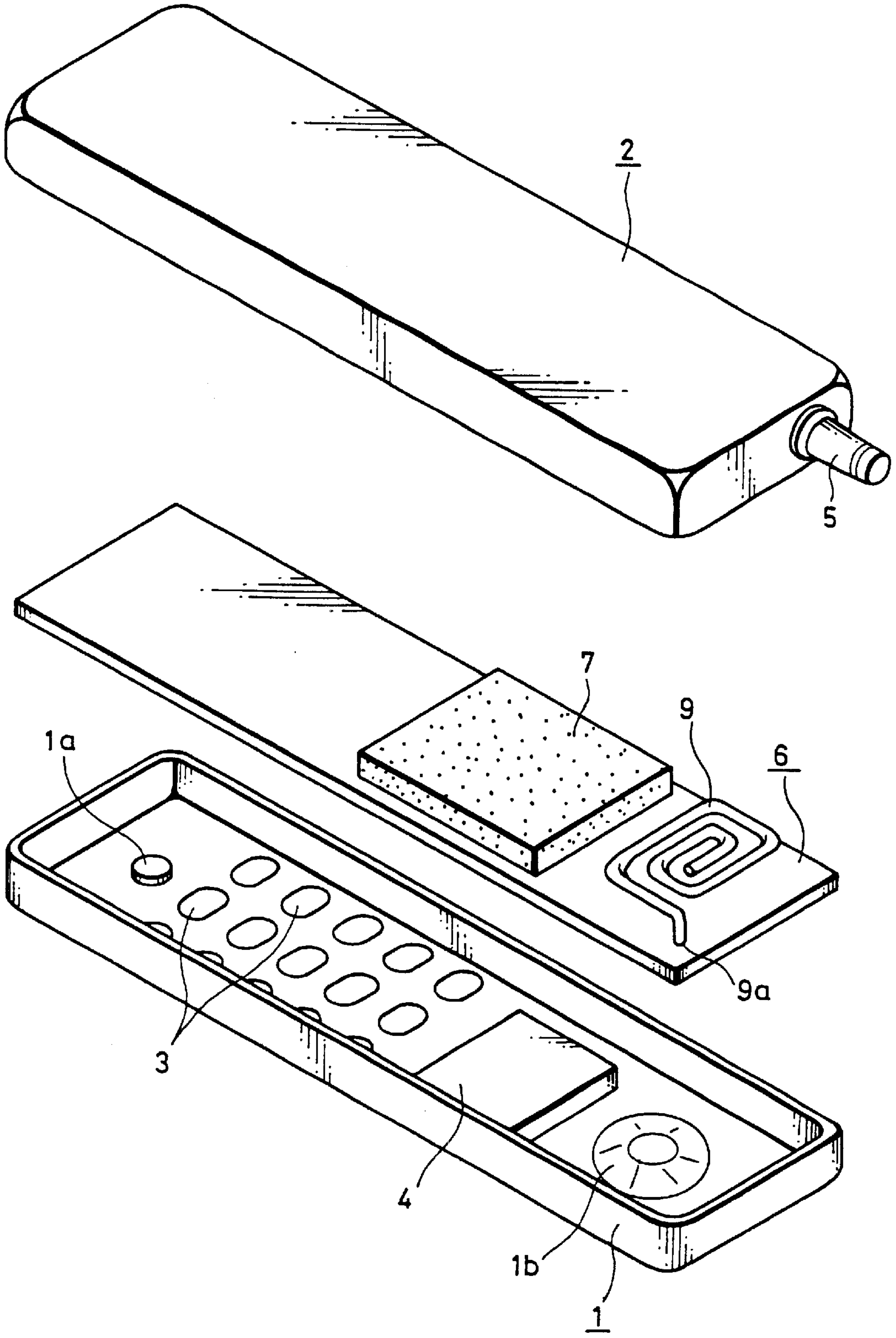
FIG. 4 is an exploded, perspective view of a and conventional communication terminal equipment.

In the present mode, the present invention is shown as a portable telephone using a helical antenna and FIG. 1 is an exploded perspective view of the portable telephone. A surface-side case 1 and a back surface-side case 2 formed of resin are joined to each other, thereby providing a terminal equipment constituted as a housing of the portable telephone. A plurality of operation keys 3 are arranged on the surface-side case 1. Also, a microphone 1*a*, a speaker 1*b*, a display panel member 4 and the like are arranged on the case 1. Further, the tip end portion of a rod-like whip antenna 5 is arranged at a position which becomes an upper side when using the equipment. In the present mode, the whip antenna 5 is attached to the back surface-side case 2 and constituted as an expandable antenna. The constitutions of the surface-side case 1 and the back surface-side case 2 are exactly the same as those of the surface-side case 1 and the back surface-side case 2 shown in FIG. 4 as prior art.

Circuit components constituting a circuit for radio communications, a circuit controlling the display of the display panel member 4 and the like, are incorporated onto the circuit board 10 which is arranged between the surface-side case 1 and the back surface-side case 2. In addition, a whip antenna connection section 11 is provided on the end portion of the circuit board 10.

A shield case 20 is attached so as to cover predetermined circuit components on the circuit board 10. FIG. 2 is a perspective view showing a state in which the shield case 20 is detached from the circuit board 10, and FIG. 3 is a perspective view showing the shield case 20 from the back surface side. The shield case 20 is constituted by a resin-formed member such as ABS resin and has a shield section 21 occupying about ⅔ of the case 20 and non-shield section 22 provided on the remaining portion. This non-shield section 22 is formed on a portion which become an upper side relative to the shield section 21 while being attached to the circuit board when this equipment is used as a portable telephone. The inside of the boundary portion between the shield section 21 and the non-shield section 22 is provided with a wall section 24 as shown in FIG. 3.

The shield section 21 of the shield case 20 has a conductor film formed to be coated on the surface of the case 20 and also coated on an inner surface 25 partitioned by the wall section 24. This conductor film is brought into contact with the ground potential section (ground section) of the circuit board 10 to thereby obtain a shield effect for shielding the predetermined circuit components (e.g., circuit components 14 shown in FIG. 2) on the circuit board 10 covered with the shield case 20. That is, as shown in FIGS. 1 and 2, a shield case connection section 13 continuous to the ground potential section on the circuit is provided on the circuit board 10. This connection section 13 is constituted to contact with the side surface of the shield section 21 of the shield case 20 when arranging the shield case 20 on the circuit board 10. In that case, the connection section 13 is made of, for example, an elastic metal member so as to ensure the contact of the connection section 13 with the shield case 20 by the elastic force of the section and to maintain a shield function. The inner surface 25 of the shield section 21 is also continuous to the ground potential section on the circuit. The shielding conductor film on the surface and the back surface of the shield section 21 is formed by, for example, coating tin by metal plating.

An antenna pattern 23 is formed on the upper surface of the surface of the non-shield section 22 of the shield case 20. This antenna pattern 23 is coated with, for example, copper by metal plating. The antenna pattern 23 is formed as a pattern wound helically with a predetermined size so as to function as a helical antenna as shown FIGS. 1 and 2. An end portion **23*a* which is the outermost periphery of the wound pattern is arranged on the side wall (or in this case, an end portion which becomes an upper side when the equipment is used as a portable telephone) of the shield case 20**.

The end portion **23*a* of the antenna pattern 23 is constituted to contact with a feeder section 12 provided on the circuit board 10. Namely, when the shield case 20 is arranged on the circuit board 10, the feeder section 13, which serves as an antenna input terminal section of the circuit incorporated into the board, is constituted to contact with the end portion 23*a* of the antenna pattern 23 of the shield case 20. In this case, the feeder section 12 is formed of, for example, an elastic metal member to ensure the contact of the feeder section with the pattern 23** by the elastic force thereof, thereby maintaining the certainty of antenna connection.

It is noted that the communication terminal equipment in this example is constituted such that the helical antenna constituted by the antenna pattern 23 is used as an antenna for reception purpose only and the whip antenna 5 provided separately from the helical antenna as shown in FIG. 1 is used as an antenna for both transmission and reception purposes, and that diversity reception is conducted using one antenna capable of ensuring good signal reception out of the two antennas during reception.

According to the communication terminal equipment constituted as stated above, the helical antenna is formed integrally with the shield case 20. Therefore, compared with a case where a helical antenna is attached to a circuit board as a separate member, the number of components of the communication terminal equipment can be reduced and the constitution of the communication terminal equipment can be thereby simplified. Further, as for the helical antenna attachment operativity, only by arranging the shield case 20 on the circuit board, the antenna can be simultaneously attached to the board. Thus, compared with a conventional case where the feeder section of an antenna is connected to a circuit board by soldering or the like, attachment can be made with quite simple operation.

In the present mode, in particular, an elastic member is used as the feeder section 12 connected to the antenna pattern 23 constituting the helical antenna and the contact of the feeder section 12 with the antenna pattern 23 is ensured by the elastic force thereof. Thus, the antenna can be surely connected without the need to carry out any special connection operation.

In the above-stated mode for carrying out the invention, the present invention is applied to the helical antenna incorporated into the communication terminal equipment as a portable telephone. The present invention is also applicable to a helical antenna provided at other communication terminal equipment. Further, in the above-stated mode for carrying out the invention, the helical antenna is used as an antenna for reception purpose only. However, the helical antenna may be used as a transmission antenna or an antenna for both transmission and reception purposes. Besides, the shape of the antenna pattern constituting the helical antenna is not limited to the shape shown in FIGS. 1 and 2. Various patterns can be adopted as long as they have good reception characteristics or transmission characteristics as an antenna.

Furthermore, in the above-stated mode for carrying out the invention, the antenna pattern is arranged on the outer surface of a member constituting the shield case. Alternatively, the antenna pattern may be formed on the inner surface of the case. Alternatively, antenna patterns may be formed on both the outer surface and the inner surface of the member.

According to the antenna equipment described above, the conductor pattern formed on the surface or the inner surface of the housing functions as an antenna element. Thus, only by arranging the housing on the circuit board, the antenna can be attached to the circuit board, thereby constituting an antenna which can be easily attached to the equipment.

According to the antenna equipment described above, the housing is the outer resin member having a conductor film arranged on a portion other than the neighborhood of a portion on which the conductor pattern is arranged, and the conductor film is brought into contact with the ground potential section of the circuit board to function as a shield, thereby constituting the antenna equipment integral with a shield case required by a communication equipment.

According to the communication terminal equipment described above, the conductive pattern formed on the outer surface or the inner surface of the shield case functions as an antenna element. Thus, only by arranging this shield case on the circuit board, an antenna can be attached to the circuit board, whereby the number of components for the terminal equipment can be reduced accordingly, an antenna attachment step is not required and the assembly operativity of the terminal equipment enhances.

According to the communication terminal equipment on the invention recited in claim 3, the feeder section is constituted by a conductive member connected to the circuit board and having a predetermined elastic force, and the feeder section is made continuous to the conductor pattern by the elastic force of this member, whereby a soldering step is not required for the connection between the antenna and the circuit board and easy, good antenna connection can be ensured.

Having described preferred embodiments of the present invention with references to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. An antenna equipment comprising:

a circuit board;

a housing arranged on said circuit board;

an antenna conductor pattern formed into a predetermined pattern on one of an outer surface of said housing and an inner surface of said housing; and a feeder section for making a circuit and being formed on said circuit board and being an extension of said antenna conductor pattern, wherein said housing is formed of a resin having an electrical conductor film arranged on a portion other than a neighborhood of a portion thereof on which said antenna conductor pattern is arranged; and said electrical conductor film is brought into contact with a ground potential section of said circuit board to thereby function as a shield.

2. A communication terminal equipment comprising:

a circuit board on which a communication circuit is arranged;

a shield case arranged on said circuit board and shielding at least a part of an interior of said circuit with a conductor film formed on one of a part of an outer surface of the shield case and an inner surface of the shield case;

a conductor pattern formed into a predetermined pattern on one of a portion of the outer surface and the inner surface of said shield case on which portion the conductor film is not formed; and a feeder section making said conductor pattern continuous with an antenna connection section of the communication circuit arranged on said circuit board.

3. The communication terminal equipment according to claim 2, wherein said feeder section comprises a conductive member connected to said circuit board and having a predetermined elastic force for making the circuit board continuous with said conductive pattern by the elastic force of the conductive member.

* * * * *